Jan. 11, 1949.  J. DORSKY ET AL  2,458,691
APPARATUS FOR CHLORINATION PROCESSES
Filed Oct. 15, 1946
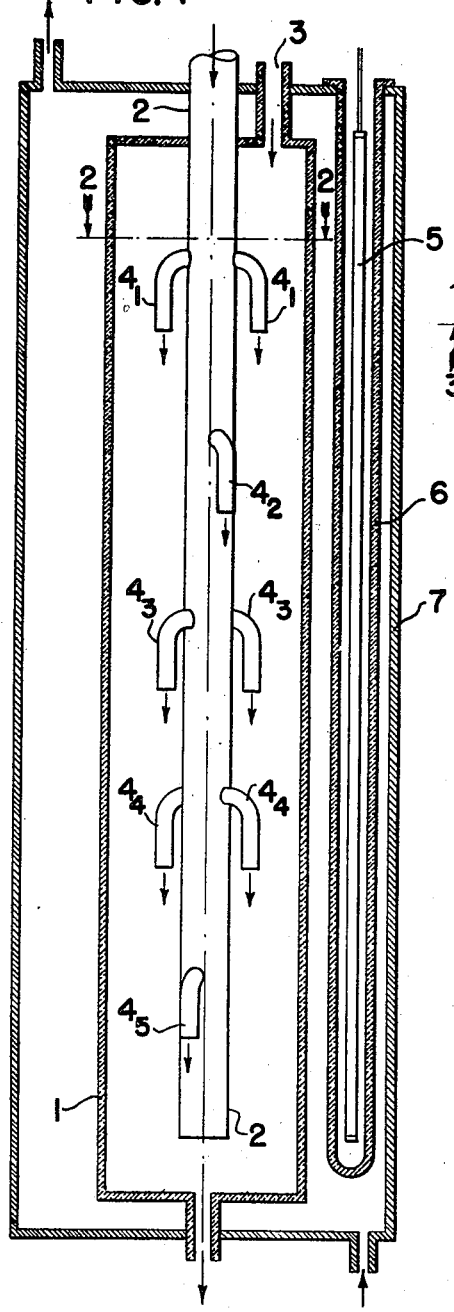
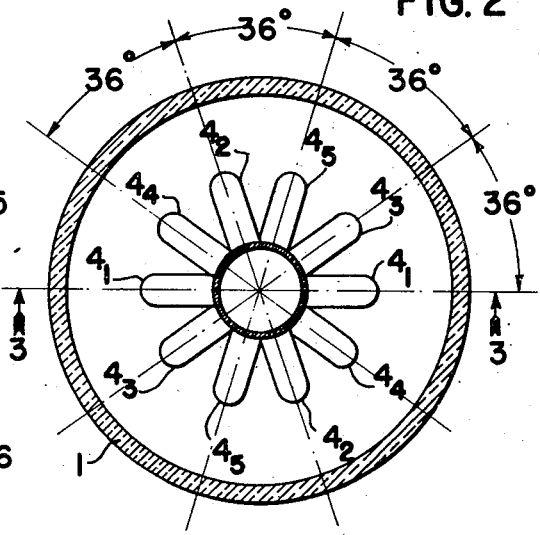
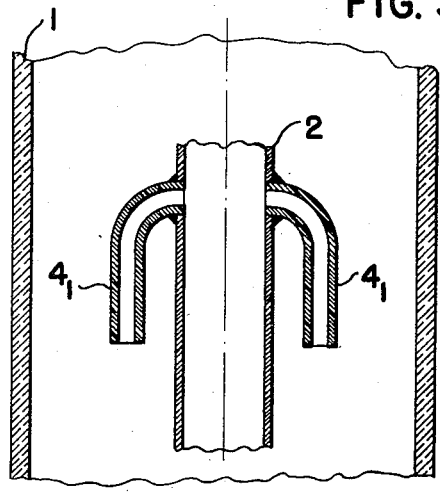
INVENTOR.
Julian Dorsky
George W. Mattson
Clarence W. Neher
By J. E. W. Morrison Patented Jan. 11, 1949

2,458,691

UNITED STATES PATENT OFFICE 2,458,691

APPARATUS FOR CHLORINATION PROCESSES

Julian Dorsky, George W. Mattson, and Clarence M. Neher, Baton Rouge, La., assignors to Ethyl Corporation, New York, N. Y., a corporation of Delaware Application October 15, 1946, Serial No. 703,276

2 Claims. (Cl. 250—43)

This invention relates to an apparatus for carrying out the gas-phase photochemical chlorination of gaseous hydrocarbons. An important object of this invention is to provide apparatus for carrying out a gas-phase chlorination continuously for much longer periods and in a safer manner than possible with prior commercial apparatus. Our invention comprises a tubular reactor with a concentric chlorine feed tube, the feed tube having a number of spaced chlorine outlet branch tubes of smaller size, the outlet tubes being so constructed that chlorine travels longitudinally of the reactor tube and so does not impinge directly on the surface of the reactor wall.

The action of light in promoting halogenation reactions is a well-known phenomena, having been observed as long ago as 1849 by Kolbe and Frankland (J. Chem. Soc., vol. 1, pp. 65-9). Since that time many investigators have sought to utilize light in gas-phase substitution chlorination processes. Some of the reactors previously proposed for carrying out gas-phase photochemical processes are those disclosed in the United States patents to Snelling, 1,285,823 and 1,523,563 and to Leiser and Ziffer, 1,459,777.

In the drawings illustrating the application of this invention to photochemical chlorination, Fig. 1 is a longitudinal cross section of the apparatus with the central chlorine feed tube and multiple jets in elevation; Fig. 2 is a horizontal cross section on the line 2—2 of Fig. 1; and Fig. 3 is an enlarged cross section on the line 3—3 of Fig. 2 showing a pair of jets and their position relative to the reaction tube and the chlorine feed tube.

Our apparatus, adapted for photochemical chlorination, comprises essentially a straight glass reaction tube 1, transmissive of actinic light and a concentric chlorine feed tube 2. The chlorine feed tube 2 is preferably made of metal which is resistant to chlorine and the hydrogen chloride formed in substitution chlorination reactions. Nickel has been found very satisfactory for this application. The glass reactor tube 1 is preferably made of heat-resistant glass such as "Pyrex" brand. Hydrocarbon gas or vapor is fed to the annular reaction zone between the glass and metal tubes, being admitted at one end of the reactor, at 3. Chlorine is fed to the metal feed tube 2 at the same end, and is admitted to the surrounding annular reaction zone by a series of spaced branch tubes, $4_1$, $4_2$, $4_3$, $4_4$, $4_5$, of smaller diameter than the main feed tube 2. The branch feed tubes are so constructed that the chlorine leaving the main feed tube 2 does not impinge on the glass wall of the reactor tube. If the chlorine is allowed to impinge on the reactor tube wall, we have found that the wall rapidly becomes fouled with dark material, preventing full irradiation of the reactor or stopping the reaction completely. In contrast, if the branch feed tubes of our design are used, fouling of the reactor is greatly reduced and continuous operation is possible for a much longer period of time before cleaning is required. The products of the reaction leave the reactor tube at the end opposite the feed end and pass to suitable purification and separation equipment. Tests have shown that our design allows continuous operation for as long as 100 to 175 hours, in contrast to 5 to 16 hours possible if the chlorine is allowed to impinge on the reactor tube walls. In addition, our invention prevents thermal shock or stress occurring when chlorine impingement on the reactor tube walls causes localized regions of concentrated reaction and heat release.

The dimensions of the reactor are not critical to its successful performance. In one successful model, the reactor tube 1 was a 3-in. Pyrex tube 10 ft. long. The chlorine feed tube 2 was ¾-in. outside diameter and 6 ft. long. Ten small branch tubes, $4_1$, $4_2$, $4_3$, $4_4$, $4_5$, made of ¼-in. outside diameter by ⅛-in. inside diameter were attached to the chlorine feed tube 2 in five pairs spaced at equal intervals along the tube. The lower end of the chlorine feed tube was welded shut, but a small hole (about the same size as the internal diameter of the chlorine branch tubes 4) was then drilled at this point. This allows any liquid impurities in the chlorine stream to drain from the chlorine tube 2.

A satisfactory light source 5 is a fluorescent light that gives maximum emission in the near ultraviolet region. The light source 5 may be in an air space formed by a glass tube 6.

The reactor tube is preferably immersed in cooling water in a metal jacket 7. The cooling removes heat of reaction, and prevents thermally initiated reactions.

Figure 3 shows a satisfactory method of inserting the chlorine jets in the chlorine feed tube. Figure 2 shows the preferred arrangement of the chlorine feed tubes around the circumference of the main feed tube. The staggered arrangement of the chlorine outlet tubes around the circumference of the main feed tube is not critical, although it is preferable that this or similar circumferential arrangement be used. We have found that better results are obtained if care is used in bending the jets so that the chlorine flow will be uniformly divided among the branch tubes.

This specific construction we find simpler to make than using a manifold header and jets of varying length.

We claim:

1. A photochemical apparatus for the chlorination of hydrocarbons comprising a straight glass reactor chamber transmissive of actinic light, a surrounding jacket for a heat removing liquid, a light transmissive enclosure in the liquid adjacent the outer wall of the glass reaction chamber and having lights therein, a coaxial chlorine feed tube in the chamber and a multiplicity of jets projecting from the tube into the reaction chamber and pointing axially of the latter, the ends of the jets being spaced axially and circumferentially of the chamber.

2. A photochemical apparatus for the chlorination of hydrocarbons comprising a straight glass reactor chamber transmissive of actinic light, a surrounding jacket for a heat removing liquid, a light transmissive enclosure in the liquid adjacent the outer wall of the glass reaction chamber and having lights therein, a coaxial chlorine feed tube in the chamber and a multiplicity of jets projecting from the tube into the reaction chamber and arranged in pairs spaced axially and circumferentially about the tube with the jets projecting axially of the chamber.

JULIAN DORSKY.
GEORGE W. MATTSON.
CLARENCE M. NEHER.

REFERENCES CITED

The following references are of record in the file of this patent:

UNITED STATES PATENTS

| Number | Name | Date |
|---|---|---|
| 1,969,655 | Mailey | Aug. 7, 1934 |
| 2,121,981 | Prudhomme | June 28, 1938 |

FOREIGN PATENTS

| Number | Country | Date |
|---|---|---|
| 452,656 | Great Britain | Aug. 26, 1936 |